United States Patent Office 3,796,581
Patented Mar. 12, 1974

3,796,581
MARGARINE FAT CONTAINING INTERESTERIFIED CONSTITUENTS

Karl Frommhold, Berlin, Germany, assignor to Lever Brothers Company, New York, N.Y.
No Drawing. Continuation-in-part of application Ser. No. 218,618, Jan. 17, 1972, which is a continuation-in-part of application Ser. No. 802,221, Feb. 25, 1969, both now abandoned. This application May 23, 1972, Ser. No. 256,136
Claims priority, application Germany, Feb. 28, 1968, P 16 92 539.6
Int. Cl. A23d 3/00
U.S. Cl. 99—122 MO    6 Claims

ABSTRACT OF THE DISCLOSURE

The margarine fat formulation comprises:
(A) A liquid fat containing at least 40% polyunsaturated fatty acids;
(B) A fat of a melting point of 41–45° C. containing or consisting of hydrogenated soya fat;
(C) A fat of a melting point of 25–40° C., at least part of at least the constituents (A) and (B) being interesterified.

CROSS REFERENCES TO RELATED APPLICATIONS

This application is a continuation-in-part of my earlier application Ser. No. 218,618, filed Jan. 17, 1972, now abandoned which in turn was a continuation-in-part of Ser .No. 802,221, filed Feb. 25, 1969, now abandoned.

BACKGROUND OF THE INVENTION

Field of the invention

The present invention relates to margarine fat, which may be used in the preparation of margarine, and to margarine made therefrom.

The invention especially relates to margarine fats from which margarines of such a consistency can be made that they may be packed either in wrappers or tubs.

The term "fat" is used herein to include both the fatty acid triglycerides which are solid at about 20° C. and triglycerides which are liquid at that temperature and which are commonly described as "oils."

A margarine fat is a fat blend which is suitable for use as the sole fat in a margarine.

The taste and the melting behavior of margarine fat characterizes to a large extent the properties of the finished margarine. These include not only the eating properties of the product, for instance the quick-melting in the mouth which provides a good oral response, but also the spreadability and consistency of the product. In addition, the melting behavior may also determine the suitability of the product for wrapping or tub-packing during its manufacture.

Dilatation values which are a measure of the amount of solid fat at a certain temperature in a fat blend are normally used to characterize the melting behavior of fat blends. In this specification the dilatations specified are determined by the method described in Boekenoogen, "Analysis and Characterisation of Oils, Fats and Fat Products," 1964, Interscience Publishers, London, pages 143–145.

The organoleptic properties of margarine are closely related to the dilatation at 30–36° C. of the fat used in its preparation. A very good margarine from this standpoint will have dilatation values at 30° and 36° C. of below 120 and below 25. Less desirable but still acceptable values would be e.g. below 150 and 50 and even below 180 and 60.

At lower temperatures, e.g. 20–25° C., the dilatation values of the fat composition indicate the suitability of the margarine for spreading purposes. Thus at 20° C. a range of 150–550 and at 25° C. of 100–350 would permit the margarine product to be easily spread at room temperature, i.e. 20–25° C.

Dilatation values for wrapper margarines at 20 and 25° C. of 300–550 and 200–350 give rise to no or at most very little oil exudation and the margarine product retains its shape well at these temperatures. For tub margarines the corresponding dilatation values may be lower, e.g. 150 at 20° C. and 100 at 25° C., because oil exudation and shape-retaining properties are less important.

Provided the dilatation value below room temperature is not too high, e.g. less than 750 or 800 at 5° C. the margarine may be spread even after storage at approximately this temperature.

The present invention provides a fat composition suitable for use in the preparation of margarine capable of being packaged by wrappers or tubs according to the dilatation characteristics of the fat and having in each case good melting properties conferring excellent organoleptic characteristics on the margarine. The margarine fat of the invention contains more soya-bean fat than was hitherto possible in margarines of good and first class quality.

DESCRIPTION OF THE PRIOR ART

In the book "Margarine" by Anderson and Williams, Pergamon Press, second revised edition, 1965, on pages 70 and 71 in total 29 different margarine-fat blends are disclosed, most of them consisting of liquid oils, oils of melting points of 40–48° C., and oils of melting points of 25–40° C. Not a single one of said fat blends contains any hydrogenated soya-bean fat and none of these 29 fat blends contains any interesterified fats.

The U.S. patent specification 2,921,855 (Melnick) is directed to interesterifying fats and oils for purposes of maintaining a high content of essential oils which are lost as a result of hydrogenation of the oil. Therefore, Melnick teaches that at least 70% of a limpid unhydrogenated or only slightly hydrogenated oils is to be used, the balance being hydrogenated fat (see col. 5, lines 72–73 and col. 6, lines 60–62). The melting points of the hydrogenated fats suggested by Melnick are in the range of 52.5–75° C. (see col. 6, lines 10–11), which is appreciably above the highest melting point of any constituent of the instant invention. Melnick does not suggest or recognize that a high content of hydrogenated soya fat can be used to prepare a margarine without the disadvantages inherent in using soya fat.

The U.S. patent specification 3,099,564 (Gooding) teaches preparing margarines consisting of 50–80 parts cotton seed stearine and 50–20 parts of a substantially completely hydrogenated interesterified base fat which is characterized by solid content indices. Gooding's interesterified base fat is hydrogenated to saturation (cf. col. 2, lines 59–60) and can be composed of interesterified fats or fat blends, e.g. containing completely hydrogenated coconut oil and cotton seed stearine, completely hydrogenated palm kernel fat, completely hydrogenated palm kernel fat and cotton seed stearine, etc.

At most 40% of interesterified constituents are present in Gooding's margarine fat blends and the proportion of fats of a melting point from 25–40° C. in the margarine fat is very much greater than in the instant invention. Therefore, at 10° C. (50° F.) S.C.I. values of 36–45, corresponding to dilatation values of at least 950 are obtained, whereas the products of the instant invention are all less hard at 10° C. and thus better spreadable at low temperatures.

SUMMARY OF THE INVENTION

The product of the invention contains, apart from a liquid fat containing at least 40% of polyunsaturated fatty acids and a fat of a melting point of 25–40° C., e.g. coconut oil, at least about 16% of hydrogenated soya-bean fat of a melting point of 41–45° C. The latter fat is, probably due to the combined effect of hydrogenation and interesterification (from 70–100% of said soya-bean fat should be interesterified), less liable to flavor reversion than could readily be expected. Even products containing up to 60% of hydrogenated soya-bean fat can be prepared according to the invention without deterimentally affecting the organoleptic characteristics and dilatometric properties of the ultimate margarine.

DESCRIPTION OF THE INVENTION

The present invention provides a margarine fat having a dilatation value at 20° C. from 150–550, at 25° C. from 100–350, at 30° C. of at most 150 and at 36° C. of at most 50, said fat consisting essentially of:

(A) 20–50% of a liquid fat containing at least 40% of polyunsaturated fatty acids,
(B) 20–60% of a fat with a melting point of from 41–45° C., comprising at least 16% based on the margarine fat of hydrogenated soya fat, any balance of (B) being hydrogenated palm fat,
(C) 15–50% of a fat of a melting point of 25–40° C., and wherein from 15–100% of constituent (A), from 70–100% of constituent (B) and from 0–100% of constituent (C) are interesterified to provide from 40–100% of interesterified constituents in the margarine fat.

The composition of the margarine fat is determined by the organoleptic characteristics required, the nature of the packaging technique to be used, whether wrapping or tub packaging, and the extent of interesterification between the constituents of the margarine fat. The latter operation produces compositions having lower dilatation characteristics than are obtained by merely blending the constituents. Thus, a high proportion, e.g. 40% or even more of hard fat component (B) may be incorporated in the margarine to give a wrapped package margarine which has nevertheless good organoleptic characteristics. It is particularly preferred to interesterify the whole of constituent (B) and at least 20% of the constituent (C), together with some or all of constituent (A). Preferably also 20–50% of the constituent (A) is interesterified. Again, the preparation of a margarine according to the invention which is intended to be wrapped is preferably carried out with the interesterification of the whole of the liquid fat constituent (A). On the other hand, a smaller quantity of the liquid fat constituent (A), e.g. 20–25%, is preferably present in margarine intended for wrapping than is preferably present in the fat used for the preparation of tub margarine. In the latter case, the amount of liquid fat present is preferably from 30–50%, of which from 20–50% is interesterified.

According to a specific embodiment of the invention margarine fats are provided which are suitable for refrigerator-type margarines and have dilatation values at 5° C. of at most 800, at 20° C. of 150–450, at 25° C. of 100–250, at 30° C. of at most 150 and at 36° C. of at most 50, comprise from 40–80% interesterified constituents (A) and (B), or (A), (B) and (C). The liquid fats (constituent (A)), containing at least 40% of polyunsaturated fatty acids, can be used for the margarine fats of the invention and are natural liquid fats, such as e.g. sunflower, safflower, cottonseed, wheat germ, soya-bean, grape seed, poppy seed, tobacco seed, rye, walnut, or corn fat; cottonseed, sunflower and groundnut fat being preferred.

As constituent (B) of the fat composition of the invention 16–60% of highly hydrogenated soy-bean fat is used, if need be together with 0–44% of palm fat, calculated on the margarine fat. Hydrogenated soya-bean fat is a raw material of particular economic interest. Hitherto it has only been possible to use it in rather limited proportions, e.g. 5% in margarines of good and first class quality.

Unhydrogenated soya-bean fat itself may develop an unpleasant taste on storage, which may be termed according to the stage "seedy"-like green beans, "varnish-like of "fishy." It is widely believed that this deterioration of taste is brought about by the oxidation of the linolenic acid, which is present in the unhydrogenated fat and which is substantially completely removed from the highly hydrogenated soya-bean fat used as constituent (B).

A particular advantage of the invention consists in the fact that it enables margarines with outstanding melting behavior to be prepared which contain substantial amounts of highly hydrogenated soya-bean fat.

Fats suitable for use as constituent (B) may be obtained by hydrogenating the above-mentioned fats with a fresh active nickel catalyst, e.g. nickel precipitated on guhr, at a temperature of 150–180° C. and a pressure from atmospheric to 5 atm.

The constituent (C) may consist of hardened and/or nonhardened fat or fat fractions, e.g. coconut, palmkernel, babassu and palm fat. Further, groundnut, cottonseed, sunflower, whale and fish fat may be used, after hydrogenation, e.g. by 1.5% by weight of a sulphur-poisoned nickel catalyst, precipitated on kieselguhr at temperatures from 150–180° C.

The interesterification treatment may be carried out batchwise or continuously, using a variety of catalysts, e.g. alkali metals, their hydroxides, alkoxides and soaps, sodamide and titaniumtetraalkoxide. The reaction may be carried out as follows:

The mixture to be interesterified is dried to a water content below 0.03% and subsequently interesterified at a temperature of 110–140° C. in a stirred vessel which has been kept under reduced pressure of e.g. 2 mm. Hg, in the presence of 0.01–0.3% by weight of sodium ethoxide as a catalyst. After about 20 minutes the vacuum is released. The catalyst is destroyed by washing the interesterified mixture, e.g. with 10% of an 0.4 N aqueous lye solution. The interesterified mixture is then washed with water and dried as before.

The invention will be more clearly understood by reference to the accompanying examples in which all parts and percentages are expressed by weight.

EXAMPLE I

A base fat was made by the undirected interesterification of a mixture of the following fats:

| | Wt. percent |
|---|---|
| (A) sunflowerseed fat | 25 |
| (B) highly hardened soya-bean fat (M.P. 41° C.) | 75 |

Dilatations of the base fat after interesterification:

At:
| | |
|---|---|
| 5° C. | 1000 |
| 10° C. | 970 |
| 20° C. | 730 |
| 25° C. | 555 |
| 30° C. | 335 |
| 36° C. | 95 |

Melting point 33.5° C.

A margarine fat suitable for use in the preparation of a tub margarine was made by mixing:

| | Wt. percent |
|---|---|
| Base fat | 40 |
| Sunflowerseed fat | 25 |
| Coconut fat | 35 |

Dilatations of the margarine fat:

At:
| | |
|---|---|
| 5° C. | 750 |
| 10° C. | 655 |
| 20° C. | 215 |
| 25° C. | 120 |
| 30° C. | 65 |
| 36° C. | 30 |

Individual fats in the margarine fat:

| | Wt. percent |
|---|---|
| (A) Sunflowerseed fat | 35 |
| (B) Highly hardened soya-bean fat (M.P. 41° C.) | 30 |
| (C) Coconut fat | 35 |

Percentage of linoleic acid in the total mixture of fats 21%.

For this margarine fat 28.5% of constituent (A) and 100% of constituent (B) were interesterified.

EXAMPLE II

A base fat was prepared by the undirected intersterification of a mixture of the following fats:

| | Wt. percent |
|---|---|
| (A) Sunflowerseed fat | 30 |
| (B) Highly hardened soya-bean fat (M.P. 41° C.) | 40 |
| (C) Palm fat | 30 |

Dilatations of the base fat after interesterification:

At:
| | |
|---|---|
| 5° C. | 785 |
| 10° C. | 740 |
| 20° C. | 475 |
| 25° C. | 330 |
| 30° C. | 200 |
| 36° C. | 45 |

Melting point 32.5° C.

A margarine fat suitable for the preparation of a tub margarine was made by mixing:

| | Wt. percent |
|---|---|
| Base fat | 75 |
| Sunflowerseed oil | 25 |

Dilatations of the margarine fat:

At:
| | |
|---|---|
| 5° C. | 645 |
| 10° C. | 605 |
| 20° C. | 320 |
| 25° C. | 200 |
| 30° C. | 105 |
| 36° C. | 25 |

Individual fats in the margarine fat:

| | Wt. percent |
|---|---|
| (A) Sunflowerseed fat | 47.5 |
| (B) Highly hardened soya-bean fat (M.P. 41° C.) | 30 |
| (C) Palm fat | 22.5 |

Percentage of linoleic acid in the margarine fat about 28%.

In this margarine fat 47.5% of constituent (A), 100% of constituent (B) and 100% of constituent (C) were interesterified.

EXAMPLE III

A base fat was prepared by the undirected interesterification of a mixture of the following fats:

| | Wt. percent |
|---|---|
| (A) Sunflowerseed fat | 20 |
| (B) Highly hardened soya-bean fat (M.P. 41° C.) | 40 |
| (C): | |
| Palm kernel fat | 25 |
| Palm fat | 15 |

Dilatations of the base fat after interesterification:

At:
| | |
|---|---|
| 5° C. | 890 |
| 10° C. | 835 |
| 20° C. | 475 |
| 25° C. | 275 |
| 30° C. | 110 |
| 36° C. | 10 |

Melting point 30° C.

The base fat as such can be used as a margarine fat suitable for the preparation of wrapper margarine. For this margarine fat 100% of the constituents (A), (B) and (C) were interesterified.

In addition, a margarine fat suitable for the preparation of a tub margarine was prepared by mixing:

| | Wt. percent |
|---|---|
| Base fat | 80 |
| Sunflowerseed fat | 20 |

Dilatations of the margarine fat:

At:
| | |
|---|---|
| 5° C. | 730 |
| 10° C. | 650 |
| 20° C. | 355 |
| 25° C. | 240 |
| 30° C. | 95 |
| 36° C. | 10 |

Individual fats in the margarine fat:

| | Wt. percent |
|---|---|
| (A) Sunflowerseed oil | 36 |
| (B) Highly hardened soya-bean oil (M.P. 41° C.) | 32 |
| (C): | |
| Palm kernel oil | 20 |
| Palm oil | 12 |

Percentage of linoleic acid in this margarine fat about 22%.

In this margarine fat 77.5% of constituent (A), 100% of constituent (B), and 100% of constituent (C) were interesterified.

EXAMPLE IV

A base fat was prepared by the undirected interesterification of a mixture of the following fats:

| | Wt. percent |
|---|---|
| (A) Groundnut fat | 20 |
| (B) Highly hardened soya-bean fat (M.P. 41° C.) | 40 |
| (C): | |
| Palm kernel fat | 25 |
| Palm fat | 15 |

Dilatations of the base fat after interesterification:

At:
| | |
|---|---|
| 5° C. | 1015 |
| 10° C. | 900 |
| 20° C. | 640 |
| 25° C. | 305 |
| 30° C. | 195 |
| 36° C. | 25 |

Melting point 32.5° C.

A margarine fat suitable for the preparation of a tub margarine was prepared by mixing:

| | Wt. percent |
|---|---|
| Base fat | 40 |
| Sunflowerseed fat | 25 |
| Coconut fat | 10 |
| Palm fat | 10 |
| Hardened groundnut fat (M.P. 31° C.) | 10 |
| Highly hardened palm fat (M.P. 42° C.) | 5 |

Dilatations of the margarine fat:

At:
| | |
|---|---|
| 5° C. | 715 |
| 10° C. | 650 |
| 20° C. | 370 |
| 25° C. | 255 |
| 30° C. | 105 |
| 36° C. | 15 |

Individual fats in the margarine fat:

| | Wt. percent |
|---|---|
| (A): | |
| Sunflowerseed oil | 25 |
| Groundnut oil | 8 |
| (B): | |
| Highly hardened soya-bean oil (M.P. 41° C.) | 16 |
| Highly hardened palm oil (M.P. 42° C.) | 5 |

(C): Wt. percent
Coconut oil ⎫
Palm kernel oil ⎭ ---------------------------- 20
Palm oil ---------------------------------- 16
Hardened groundnut oil (M.P. 31° C.) ------- 10

In this margarine fat 24% of constituent (A), 76% of constituent (B) and 34.8% of constituent (C) were interesterified.

Percentage of linoleic acid in margarine fat about 18%.

EXAMPLE V

A base fat was prepared by the undirected interesterification of a mixture of the following fats:

| | Wt. percent |
|---|---|
| (A) Cottonseed fat | 25 |
| (B) Highly hardened soya-bean fat (M.P. 41° C.) | 55 |
| (C) Coconut fat | 20 |

Dilatations of the base fat after interesterification:

At:
- 5° C. ---------------------------------- 1000
- 10° C. ---------------------------------- 925
- 20° C. ---------------------------------- 640
- 25° C. ---------------------------------- 415
- 30° C. ---------------------------------- 200
- 36° C. ---------------------------------- 30

Melting point 32.5° C.

A margarne fat for the preparation of a fat margarine was prepared by mixing:

| | Wt. percent |
|---|---|
| Base fat | 55 |
| Sunflowerseed fat | 25 |
| Coconut fat | 10 |
| Hardened groundnut fat (M.P. 31° C.) | 10 |

Dilatations of the margarine fat:

At:
- 5° C. ---------------------------------- 785
- 10° C. ---------------------------------- 725
- 20° C. ---------------------------------- 420
- 25° C. ---------------------------------- 265
- 30° C. ---------------------------------- 115
- 36° C. ---------------------------------- 20

Individual fats in the margarine fat:

| | Wt. percent |
|---|---|
| (A): | |
| Sunflowerseed oil | 25 |
| Cottonseed oil | 14 |
| (B): | |
| Highly hardened soya-bean oil (M.P. 41° C.) | 30 |
| (C): | |
| Coconut oil | 21 |
| Hardened groundnut oil (M.P. 31° C.) | 10 |

Percentage of linoleic acid in the margarine fat about 22%.

In this margarine fat 35% of constituent (A), 100% of constituent (B), and 35.5% of constituent (C) were interesterified.

EXAMPLE VI

A base fat was prepared by the undirected interesterification of a mixture of the following fats:

| | Wt. percent |
|---|---|
| (A) Cottonseed fat | 25 |
| (B) Highly hardened soya-bean fat (M.P. 41° C.) | 50 |
| (C) Coconut fat | 25 |

Dilatations of the base fat after interesterification:

At:
- 5° C. ---------------------------------- 1010
- 10° C. ---------------------------------- 940
- 20° C. ---------------------------------- 550
- 25° C. ---------------------------------- 330
- 30° C. ---------------------------------- 140
- 36° C. ---------------------------------- 10

Melting point 32.5° C.

The base fat can be used as such as a margarine fat, suitable for the preparation of a wrapper margarine. In this margarine fat 100% of the constituents (A), (B) and (C) were interesterified.

In addition, a margarine fat was made for a tub margarine, by mixing:

| | Wt. percent |
|---|---|
| Base fat | 75 |
| Sunflowerseed fat | 25 |

Dilatations of the margarine fat composition:

At:
- 5° C. ---------------------------------- 750
- 10° C. ---------------------------------- 655
- 20° C. ---------------------------------- 400
- 25° C. ---------------------------------- 260
- 30° C. ---------------------------------- 110
- 36° C. ---------------------------------- 10

Individual fats in the margarine fat:

| | Wt. percent |
|---|---|
| (A): | |
| Sunflowerseed fat | 25 |
| Cottonseed fat | 19 |
| (B): | |
| Highly hardened soya-bean fat (M.P. 41° C.) | 37 |
| (C): | |
| Coconut oil | 19 |

Percentage of linoleic acid in the total mixture of fats 25%.

In this margarine fat 42.5% of constituent (A), 100% of constituent (B), and 100% of constituent (C) were interesterified.

EXAMPLE VII

A base fat was prepared by the undirected interesterification of a mixture of the following fats:

| | Wt. percent |
|---|---|
| (A) Sunflowerseed fat | 25 |
| (B): | |
| Highly hardened soya-bean fat (M.P. 41° C.) | 30 |
| Highly hardened palm fat (M.P. 42° C.) | 25 |
| (C) Coconut fat | 20 |

Dilatations of the base fat after interesterification:

At:
- 5° C. ---------------------------------- 915
- 10° C. ---------------------------------- 865
- 20° C. ---------------------------------- 500
- 25° C. ---------------------------------- 350
- 30° C. ---------------------------------- 135
- 36° C. ---------------------------------- 2

Melting point 30.5° C.

This base fat, also, can be used alone as such as a margarine fat, suitable for the preparation of a wrapper margarine. In this margarine fat 100% of the constituents (A), (B) and (C) were interesterified.

Each of the margarine fats obtained from the preceding examples in accordance with the invention was made up into a margarine product in the customary manner by chilling and working with an aqueous phase emulsified fat with flavoring and similar conventional agents present. The working and chilling was carried out in a "Votator" unit. The margarine products of Examples III, VI and VII (base fats) could be wrapped-packed, and all the other products of all examples, save Example IX, tub-packed. All the examples exhibited excellent oral response, being quick-melting in the mouth. They could also be readily spread, straight from the refrigerator at about 5° C. in the case of the tub-packed margarine.

What is claimed is:

1. A margarine fat having a dilatation value at 20° C. of from 150–550, at 25° C. from 100–350, at 30° C. of at most 150 and at a 36° C. of at most 50, said fat consisting essentially of:
   (A) 20–50% of a liquid fat containing at least 40% of polyunsaturated fatty acids,
   (B) 20–60% of a fat with a melting point of 41–45° C., comprising at least 16% based on the margarine fat of hydrogenated soya fat, any balance of (B) being hydrogenated palm fat.
   (C) 15–50% of a fat of a melting point of 25–40° C., and wherein from 15–100% of constituent (A), from 70–100% of constituent (B) and from 0–100% of constituent (C) being interesterified to provide from 40–100% of interesterified constituents in the margarine fat.

2. A margarine fat according to claim 1, in which all of the constituent (B) and at least 20% of the constituent (C) are interesterified.

3. A margarine fat according to claim 1, in which from 20–50% of the constitutent (A) is interesterified.

4. A margarine fat according to claim 1, which is suitable for refrigerator-type margarines, and having a dilatation value at 5° C. of at most 750, at 20° C. of 150–450, at 25° C. of 100–250, comprising 40–80% interesterified constituents.

5. A margarine fat according to claim 1, in which the constituent (A) is sunflower, safflower, cottonseed, wheat germ, soy-bean, grape seed, poppy seed, tobacco seed, rye, walnut or corn fat.

6. Margarines in which the fat phase comprises a fat composition as claimed in claim 1.

References Cited
UNITED STATES PATENTS

| | | | |
|---|---|---|---|
| 2,921,855 | 1/1960 | Melnick et al. | 99—122 MO |
| 3,099,564 | 7/1963 | Gooding | 99—122 X |

OTHER REFERENCES

Andersen et al.: Margarine, 2nd ed., 1965, Pergamon Press, New York, p. 70.

JOSEPH M. GOLIAN, Primary Examiner